United States Patent [19]

Sperley

[11] Patent Number: 4,477,611

[45] Date of Patent: Oct. 16, 1984

[54] REINFORCED RUBBER COMPOSITION CONTAINING GROUND COAL

[75] Inventor: Richard J. Sperley, Troy, Mich.

[73] Assignee: Uniroyal, Inc., New York, N.Y.

[21] Appl. No.: 530,163

[22] Filed: Sep. 7, 1983

[51] Int. Cl.$^3$ ................... C08K 3/10; C08K 5/01; C09J 3/14; C09J 3/30

[52] U.S. Cl. .................... 524/71; 524/413; 524/440; 524/571; 427/388.1; 428/283; 428/285; 428/286; 428/323

[58] Field of Search .................... 524/71, 413, 440; 574/571; 260/730, 762, 763

[56] References Cited

U.S. PATENT DOCUMENTS

| | | | |
|---|---|---|---|
| 3,359,229 | 12/1967 | Chalex et al. | 524/65 |
| 4,008,095 | 2/1977 | Fukushima et al. | 524/71 |
| 4,017,654 | 4/1977 | Evans et al. | 428/40 |
| 4,045,380 | 8/1977 | Blunt et al. | 524/571 |
| 4,169,112 | 9/1979 | Elmer et al. | 524/100 |
| 4,189,332 | 2/1980 | Rye et al. | 428/382 |
| 4,192,694 | 3/1980 | Rye | 428/465 |
| 4,195,679 | 4/1980 | Schonfeld et al. | 428/465 |
| 4,205,035 | 5/1980 | Kroger et al. | 524/71 |

FOREIGN PATENT DOCUMENTS 2552071  5/1977  Fed. Rep. of Germany ........ 524/71

OTHER PUBLICATIONS

Derwent Abstract 17172 C/10, (Jan. 1980), Toyo Rubber Ind. KK.
Derwent Abstract 23951 C/14, (Mar. 1980), Meltzeler.
Chem. Abstract 74-77257z, (1971), Ger. Offen. 2,019,612.
Chem. Abstract 67-44646, (1967), Fr. 1,463,682, Endter et al.
Chem. Abstract 82-87417, (1975), Japan 74-89784, Ikegami et al.

Primary Examiner—Herbert J. Lilling
Attorney, Agent, or Firm—John A. Shedden

[57] ABSTRACT

A reinforced rubber composition is provided comprising a mixture of (a) a sulfur vulcanizable rubber and (b) ground coal having an average mesh size of 25 or more and which produces an aqueous slurry with a pH of less than 7.0, and wherein a metallic reinforcing member is embedded in the rubber mixture of (a) and (b).

5 Claims, No Drawings

REINFORCED RUBBER COMPOSITION CONTAINING GROUND COAL

FIELD OF THE INVENTION

This invention relates to an improved reinforced rubber compostion useful in the manufacturing of tires. The composition can be used as a skimcoat over a wire breaker in a tire. The composition may also be useful for wire reinforced rubber hose, metallic reinforced conveyor belting, drive belts reinforced with a metal, rubber/metal composite engine mounts, and reinforced rubber storage bags or containers.

BACKGROUND OF THE INVENTION

The adhesion of a compounded elastomer vulcanizate to metallic reinforcing elements, in rubber composites, has generally presented manufacturers with a major fabrication problem. Loss of rubber-to-metal adhesion results in separation of the elastomer system from the reinforcing element and ultimately to failure of the manufactured article. It is an object of the instant invention to improve the bonding of elastomer systems to metallic reinforcement elements, thus extending the service life of the article.

A number of fillers and various filler treatments to improve the adhesion of rubber compounds to metals have been used in the prior art. The most accepted state of the art materials, channel blacks were recognized as the filler of choice when compounding rubber vulcanizates for adhesion to metal. Channel blacks imparted moderately acidic properties to the rubber stocks, thus retarding the onset of cure and improving the adhesion of the rubber to metal. However, channel blacks are no longer available due to government regulations. Therefore, subsequent art has been directed toward fillers which will improve the adhesion performance over that of the standard furnace blacks available today. For example, PPG Industries publication *Hi-Sil Silica Pigments Formulary, Volume II* of Apr. 29, 1983 disclosed the use of precipitated silica as a filler for elastomer systems. Additionally, chemical treatments of furnace blacks such as are found in U.S. Pat. Nos. 3,676,255, 3,914,148, and 3,914,149 modify the characteristics of the furnace blacks to improve rubber-to-metal adhesion.

While the various fillers used in the prior art as channel black replacements do result in a limited cure retardation and improve rubber-to-metal adhesion over that of unmodified furnace blacks, these fillers also impart undesirable qualities to the stocks. Generally, these fillers increase the raw vulcanizate stiffness making the stock more difficult to process and lowering the process safety. The stiffer stocks also require more energy input to process them through mixers, mills, calenders, extruders, etc. Additionally, the alternate fillers moderately acidify the rubber stocks to a degree that they tend to be corrosive to the rubber process machinery. The higher cost of the various fillers is a further disadvantage.

SUMMARY OF THE INVENTION

The present invention overcomes many of the above disadvantages and provides a reinforced rubber composition with improved adhesion and corrosion resistance.

The compounds of the invention find advantageous use for the manufacturing of tires because of their lower viscosity resulting in easier processing. They also exhibit improved scorch safety and lower hysteresis properties. Since ground coal is commonly a waste material, the compounds of the invention are inexpensive.

The present invention uses powdered ground coal as an acidic, non-reinforcing filler-additive in elastomer skim-stocks for enhanced rubber adhesion. Blending 2 to 60 parts ground coal per hundred parts of rubber together with rubber compounding ingredients normally practiced in compounding art, retards the cure of said compound, and results in a rubber stock which has improved rubber-to-metal adhesion when compared to normal furnace blacks. Additionally, the raw elastomer compound will have a lower density, lower viscosity, slower cure rate, and lower heat buildup (lower hysteresis) than the comparable furnace black containing compound. Ground-coal, which has generally been recognized as a dross material in the rubber compounding art, further provides an economic advantage by serving as a lower-cost filler to replace the higher cost fillers used as substitutes for channel blacks.

The rubber used in the present invention for making the reinforced rubbers for use in article manufacture may be natural (Hevea) rubber or conjugated diolefin polymer synthetic rubber of mixtures of any of them including their reclaims. Such conjugated diolefin polymer synthetic rubbers are polymers of butadienes-1,3, e.g. butadiene-1,3 isoprene, 2-3 dimethylbutadiene-1,3, isoprene, 2-3 dimethylbutadiene-1,3, and polymers of mixtures thereof and copolymers of mixtures of one or more such butadienes-1,3, with one or more other polymerizable compounds which are capable of forming rubber copolymers with butadienes-1,3, for example up to 60% by weight of such mixture of one or more monoethylenic compounds which contain a $CH_2=CH$ group where at least one of the disconnected valances is attached to an electro-negative group, that is, a group which substantially increases the electrical dissymmetry or polar character of the molecule. Examples of compounds which contain $CH_2=CH$ group and are copolymerizable with butadienes 1,3 are aryl olefins, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, metacrylonitrile, methacrylamide; vinyl pyridines, such as 2-vinyl pyridine, 2-methyl-5-vinyl pyridine; methyl vinyl ketone. Examples of such conjugated diolefin polymer synthetic rubbers are polybutadienes, polyisoprene, butadiene-styrene copolymers (SBR) and butadiene-acrylonitrile copolymers. The rubber may also contain conventional compounding and vulcanizing ingredients such as carbon black, rubber processing or softening oils which may be added as such or may be present from oil-extended rubbers, antioxidants, sulfur, zinc oxide and accelerators. Preferably the rubber is a blend of not less than 60 parts natural rubber with not more than 40 parts of a solution polymerized butadiene rubber or a solution polymerized syndiotactic butadiene rubber.

The ground coal used in the present invention as a non-reinforcing filler is of a semi-bituminous metallurgical type with the following characteristics: the particle size distribution is 25–500 mesh, preferably 150–500 mesh, and most preferably greater than 300 mesh. The ground coal should produce an aqueous slurry with a pH less than 7.0, preferably 2.0–6.5, and most preferably 4.5–6.5. The presence of the ground coal retards the onset of cure in the rubber compound and improves adhesion of said compound to metal.

The reinforcing member of the present invention is a metal or metal alloy from the following group: aluminum, brass, iron, bronze, copper, chromium, nickel, steel, tin, or zinc. Preferably, the reinforcement material is plated with one of the following materials: brass, bronze, copper, chromium, nickel, tin, or zinc. Most preferably, the reinforcing material would be brass-plated steel. The shape of the reinforcing material used may be appropriately selected according to its final product use. In general, the form may be of a filament, a cord, a band, plate or casting to which the elastomeric compound is bonded.

Two components of the present invention, i.e.: the solid rubber and the ground coal together with any other conventional compounding and vulcanizing ingredients, may be combined by means of any conventional equipment such as a mill or Banbury (TM) mixer, which provides a thorough mixing action. The ground coal is used in about 2–60 parts per 100 parts rubber, preferably 5–30 parts coal per 100 parts rubber, and most preferably 5–15 parts per 100 parts rubber. The metallic reinforcing component is embedded in the rubber compound and the composite is then vulcanized using sulfur.

The following examples illustrate the present invention. These examples should not be construed as limiting the invention but are exemplary only.

In the examples, the following methods were used. The elastomer compounds were prepared in a type B Banbury (TM) internal mixer in which the ground coal was combined with the rubber and all other compounding ingredients. Samples of the compounds were vulcanized into various test specimens for physical property testing. Unvulcanized rubber compounds were also calendered into 0.030" sheets for adhesion testing.

The following peel adhesion test method was used for evaluating the adhesion performance of the stocks given in the examples. Unvulcanized compound was calendered into a 0.030" gauge sheet, then several styles (one at a time) of brass-plated, multi-filament steel cord were laminated between two layers of the calendered sheet. These laminated test fabrics were plyed into a two-ply composite then cured for 24 minutes at 175° C. in an electrically heated platen press. The resulting composites were then tested for unaged and aged adhesion.

The unaged samples were tested in an Instron Univeral Tester at 121° C. Samples were pulled apart at a constant rate of 12.7 cm/min. and rated for both adhesion force and for rubber coverage over the wire.

Additionally, samples identical to the unaged specimens were aged in a steam autoclave at 105° C. for 16–36 hours with the wire ends exposed. The aged samples were then tested for adhesion in the same manner as for the unaged samples.

In the examples the stock viscosity of the unvulcanized rubber compounds was determined using a Scott-ST1/200 Mooney Viscometer at 100° C. following ASTM Method D1646.

In the examples the hysteretic properties of the compounds were tested using vulcanized specimens in a Rheovibron Viscoelastometer. The stock was milled into a sheet, then vulcanized into a 0.035" thick test sample. The resulting test specimens were then tested at 110 Hz both at 25° C. and 100° C. The stock hysteresis was reported as a Tan δ value which relates to the hysteretic properties of the vulcanized rubber compounds.

Table I below illustrates the results of Examples 1–4. Table II illustrates the results of Examples 5–8. Table III illustrates the results of Examples 9 and 10. The following definitions apply to Tables I, II and III:

Natural Rubber: SMR 5CV
Antioxidant:
   BLE ® Diphenylamine-Acetone Condensate
   Flexzone 7L ® N-Phenyl-N'-1,3-Dimethyl Butyl-p-phenylene diamine
Tackifying Resin:
   CR8787 Phenolic Resin
   BCT Phenol-formaldehyde Resin
Noxy: N-oxydiethylene benzothiazole-2-Sulfenamide
Ground Coal: Semi-bituminus coal ground to an average particle size of 300 mesh, produces an aqueous slurry having a ph of 45–65
DTDM: 4,4' DiThiodimorpholine
Sulfur: Crystex insoluble sulfur
Bonding Resin: Resorcinol-formaldehyde resin
Extender Oils:
   Highly aromatic oil
   naphthenic oils
Cobalt Salts: Cobalt naphthenate or cobalt stearate or other cobalt organo-metallic salts

TABLE I

|  | Example 1 | Example 2 | Example 3 | Example 4 |
| --- | --- | --- | --- | --- |
| Natural Rubber | 80.00 | 80.00 | 70.00 | 80.00 |
| CIS BR | 20.00 | 20.00 | 30.00 | 20.00 |
| N-351 Black | 55.00 | 50.00 | 50.00 | 50.00 |
| Ground Coal | — | 15.00 | 10.00 | 5.00 |
| Act. ZnO | 7.00 | 7.00 | 7.00 | 7.00 |
| Stearic Acid | 1.50 | 1.50 | 1.50 | 1.50 |
| BLE | 1.50 | 1.50 | 1.50 | 1.50 |
| Aromatic Oil | 10.00 | 10.00 | 10.00 | 10.00 |
| Noxy | 1.00 | 1.00 | 1.00 | 1.00 |
| Sulfur | 3.75 | 3.75 | 3.75 | 3.75 |
| Viscosity 100° C. Mooney ML-4 | 77 | 77 | 74 | 73 |
| Tan δ 25° C. 110 Hz | .246 | .225 | .205 | .227 |
| 100° C. 110 Hz | .166 | .145 | .138 | .151 |
| 1 × 4 × .38 Wire Hot Strip Adhesion 121° C. Cure 24' @ 175° C. |  |  |  |  |
| Pull in N/cm/% Coverage Steam Aged 105° C. 16 Hrs. Cured 24 min. @ 175° C. | 54/90% | 52/85% | 43/95% | 56/80% |

TABLE I-continued

|  | Example 1 | Example 2 | Example 3 | Example 4 |
|---|---|---|---|---|
| Pull N/cm/% Coverage | 47/50% | 43/20% | 34/10% | 49/30% |

TABLE II

|  | Example 5 | Example 6 | Example 7 | Example |
|---|---|---|---|---|
| Natural Rubber | 80.00 | 80.00 | 75.00 | 75.00 |
| CIS BR | 20.00 | 20.00 | 25.00 | 25.00 |
| N-341 Black | 55.00 | 45.00 | — | — |
| N-351 Black | — | — | 55.00 | 50.00 |
| Ground Coal | — | 15.00 | — | 10.00 |
| Act. ZnO | 10.00 | 10.00 | 10.00 | 10.00 |
| Stearic Acid | 1.50 | 1.50 | 1.50 | 1.50 |
| Tackifying Resin | 5.00 | 5.00 | 5.00 | 5.00 |
| Extender Oil | 5.00 | 5.00 | 15.00 | 15.00 |
| Antioxidant | 2.50 | 2.50 | 2.50 | 2.50 |
| Bonding Resins | 3.50 | 3.50 | 3.50 | 3.50 |
| Cobalt Salts | 1.00 | 1.00 | 1.00 | 1.00 |
| Noxy | .70 | .70 | .75 | .75 |
| DTDM | .30 | .30 | .35 | .35 |
| Sulfur | 3.75 | 3.75 | 3.75 | 3.75 |
| Tan δ 25° C. 110 Hz | — | — | .268 | .257 |
| 100° C. 110 Hz | — | — | .228 | .199 |
| 1 × 4 × .38 Wire Hot Strip Adhesion 121° C. Cure 24' @ 175° C. |  |  |  |  |
| Pull in N/cm/% Coverage | 74/100% | 60/100% | 99/99% | 86/99% |
| Steam Aged 105° C. 32 Hrs. Cured 24 min. @ 175° C. |  |  |  |  |
| Pull N/cm/% Coverage | 60/50% | 56/98% | 64/10% | 59/30% |

TABLE III

|  | Example 9 | Example 10 |
|---|---|---|
| Natural Rubber | 80.00 | 80.00 |
| CIS BR | 20.00 | 20.00 |
| N-326 Black | 50.00 | 50.00 |
| Precipitated Silica | 15.00 | — |
| Ground Coal | — | 15.00 |
| Act. ZnO | 6.00 | 6.00 |
| Stearic Acid | 1.00 | 1.00 |
| Tackifying Resin | 5.00 | 5.00 |
| Aromatic Oil | 7.00 | 7.00 |
| Antioxidant | 2.50 | 2.50 |
| Bonding Resins | 3.00 | 3.00 |
| Cobalt Salts | 1.00 | 1.00 |
| Noxy | .80 | .80 |
| DTDM | 1.50 | 1.50 |
| Sulfur | 3.75 | 3.75 |
| Mooney Viscosity 100° C. | 49 | 39 |
| Tan δ 25° C. 110 Hz | .291 | .270 |
| 100° C. 110 Hz | .220 | .211 |
| 3 × .15 + 6 × .27 Wire Hot Strip Adhesion 121° C. Cure 24 min. @ 175° C. |  |  |
| Pull in N/cm/% Coverage | 86/80% | 86/98% |
| Steam Age 16 Hrs. @ 105° C. Cured 24 min. @ 175° C. |  |  |
| Pull N/cm/% Coverage | 75/20% | 76/80% |

EXAMPLE 1

As a control, an elastomer compound was prepared in a laboratory type B Banbury (tm) internal mixer. This compound consists of a blend of natural rubber and cis-polybutadiene 100 parts; 55 parts of N-351 carbon black; and minor parts of zinc oxide, stearic acid, extender oil, an antioxidant, sulfur and additives (see Table 1). This compound was vulcanized into various test specimens for physical property testing. This compound was also tested for viscosity and for peel adhesion using the methods previously described.

The test results of Example 1 are shown in Table I. A 2 ply composite of a laminated fabric of Example 1 stock with a number of strands of 1×4×0.38 brass plated steel wire embedded in it, was prepared and tested for peel adhesion strength at 121° C. The composite showed peel strength of 54 Newtons/cm with ninety percent coverage of the wire with the test compound. A like composite sample was aged for 16 hours at 105° C. This aged composite was pulled in the same manner in an Instron tester—sample and chamber at 121° C.—with a peel pull of 47 Newtons/cm and a 50 percent coverage of the wire with the Example 1 test compound.

EXAMPLES 2, 3, 4

Example 1 was repeated with the exception of a blend of 50 phr N-351 black, an unmodified furnace black, and 15, 10 and 5 phr ground metallurgical coal respectively was used in place of the 55 phr of N-351 black. The other compounding ingredients were the same with a minor variation in the polymer blend in Example 3. The mixing of these test compounds and testing was done in the same manner as for Example 1. The three test compounds were each calendered to a 0.030 gauge sheet and each respectively laminated into a wire containing fabric imbedded strands of 1×4×0.38 brass plated wire between two layers of the calendered elastomer compounds. (Test results are in Table I.)

The composite from Example 2 gave an adhesion peel strength of 52 Newtons/cm with an 85% coverage of the wire. Example 3 composite had a lower adhesion peel strength 43 Newtons/cm with a wire coverage of 95%. Example 4 wire-compound composite tested for peel adhesion strength of 56 Newtons with an 80 coverage of the wire.

Like composite test samples of Examples 2, 3, and 4 were aged in a low pressure autoclave for 16 hours at 105° C. Samples were tested for adhesion peel strength in the same manner as the unaged composites (see Table I).

The aged composite of Example 2 compound and the 1×4×0.38 brass plated wire pulled 43 Newtons/cm and had a 20% elastomer coverage. The Example 3 composite gave a peel strength of 34 Newtons/cm with a lower 10% coverage. The steam aged composites from Example 4 compound and the subject wire gave a higher peel strength than the control Example 1 composite. The pull being 49 Newtons/cm and an elastomer coverage of the wire of 30%.

EXAMPLE 5

As an additional control, an elastomer compound was prepared in the same manner as Example 1. This compound containing 55 parts of N-341 black, an acid treated furnace black pH of 5.4, in a 100 part natural rubber-cis-polybutadiene rubber blend along with a standard state of the art formulation containing minor parts of zinc oxide, stearic acid, softening oils, tackifying resins, bonding resins, antioxidants, a cobalt salt, sulfur and additives. This additional control compound was celendered and tested in the same manner as Example 1 (see Table II).

The composite, 2 ply laminate of Example 5 compound and 1×4×0.38 brass plated wire at 121° C. showed a peel strength of 74 Newtons/cm with a 100% rubber coverage of the wire. Steam aging a like sample of this composite, which had the wire ends exposed, for 32 hours at 105° C. produced a peel strength of 68 Newtons/cm with a 50% coverage of the wire with rubber.

EXAMPLE 6

Example 5 compound was repeated except 45 parts of N-341 black—acid treated furnace black and 15 parts of ground metallurgical coal were substituted for the 55 parts of N-341 black. All other ingredients were the same as Example 5. Testing of Example 6 was done in the same manner as with Example 5. (See Table II).

The composite 2 ply laminate of Example 6 compound and 1×4×0.38 brass plated wire had a strip of peel pull of 60 Newtons/cm with a 100% coverage of the wire. Steam aging of a like sample of this composite which had the wire ends buffed to expose them aged 36 hours at 105° C. produced a strip peel pull of 56 Newtons/cm with a 98% rubber coverage of the wire.

EXAMPLE 7

As an additional control an elastomer compound was prepared in the same manner as Example 1. This compound contained 55 parts of N-351 black, a normal furnace black with a pH greater than 7 and a 100 part natural rubber-cis-polybutadiene rubber blend. Also in this standard state of the art formulation are minor parts of zinc oxide, stearic acid, softening oils, tackifying resins, antioxidants, bonding resins, a cobalt salt, sulfur and additives. This additional control compound was calendered and tested in the same manner as Example 1. (See Table II).

A composite-two ply laminate of Example 7 compound and 1×4×0.38 brass plated wire gave a peel adhesion pull of 99 Newtons/cm force with a 99% coverage of the wire with rubber. A like sample of this composite was aged in a steam chamber at 105° C. and for 32 hours. The peel adhesion strength of this aged sample was 64 Newtons/cm with a 10% coverage of the wire with the test compound.

EXAMPLE 8

Example 7 compound was repeated except 50 parts of N-351 black and 10 parts of acidic ground metallurgical coal were substituted for the 55 parts of N-351 black. All other ingredients in compound Example 8 are the same as in Example 7. Testing of compound 8 was done in the same manner as Example 7. (See Table II).

The tan δ of compounds 7 and 8 was determined on samples cured 12 minutes at 175° C. and tested in a Rheovibron Viscoelastometer at 110 Hz and at chamber temperatures of 25° and 100° C.

A composite-2 ply laminate of fabric made from Example 8 compound and 1×4×0.38 brass plated wire gave a peel adhesion pull of 86 Newtons/cm force with a 99% rubber coverage of the wire. A like sample of the composite was steam aged for 32 hours at 105° C. The aged sample was tested in a like manner gave a peel adhesion pull of 59 Newtons/cm with a 30% coverage of wire with the Example 8 compound.

EXAMPLE 9

As an additional control an elastomer compound was prepared in the same manner as Example 1. This compound contained 50 parts N-326 black; a normal lower structure higher pH furnace black and 15 parts of precipitated silica; an acidic mineral filler and a 100 part blend of natural rubber and cis-polybutadiene. Also in this control compound were state of the art minor parts of zinc oxide, stearic acid, softening oils, tackifying resins, antioxidants, bonding resins, a cobalt salt, sulfur and additives. This additional control compound was calendered and tested in the same manner as Example 1 (see Table III).

The viscosity of this example was tested at 100° C. in a Scott Mooney Viscometer. The compound was cured into a test piece in an electrically heated platen press 12 minutes at 175° C. and then the Tan δ was tested with a Rheovibron Viscoelastometer at 110 Hz and at 25° and 100° C. chamber test temperatures.

Test fabrics were made with 0.030" gauge calendered Example 9 compound and 3×0.15+6×0.27 brass plated wire cord gave a peel adhesion pull of 86 Newtons/cm force and with a rubber coverage of the wire of 80%. A like composite sample was buffed to expose the wire cord ends and the sample then aged for 16 hours at 105° C. The aged sample showed a pull of 75 Newtons/cm with a rubber coverage of the wire of 20%.

EXAMPLE 10

Example 9 compound was repeated except 15 parts of ground metallurgical coal was substituted for 15 parts of precipitated silica. All other ingredients of Example 10 were exactly the same as Example 9. Table III.

Testing of Example 10 compound was done in the same manner as Example 9-Viscosity and Tan δ. This test compound was also calendered to 0.030" gauge for adhesion testing.

A composite-2 ply laminate of Example 10 compound and 3×0.15+6×0.27 brass plated wire cords had a peel adhesion strength of 86 Newtons/cm with a 98% rubber coverage of the wire. A like composite sample was aged for 16 hours at 105° C. temperature. The steam aged sample showed a pull of 76 Newtons/cm with a wire coverage of rubber of 80%.

What is claimed is:

1. A wire reinforced rubber composition comprising a mixture of (a) a sulfur vulcanizable rubber and (b) 5 to 30 parts ground coal per 100 parts rubber having an average mesh size of 25 or more and which produces an aqueous slurry with a pH of less than 7.0, and wherein a metallic reinforcing member is embedded in the rubber mixture of (a) and (b).

2. A composition of claim 1 wherein said sulfur vulcanizable rubber is a natural rubber.

3. A composition of claim 2 wherein said ground coal is greater than 300 mesh and produces an aqueous slurry with a pH of 4.5–6.5.

4. A composition of claim 3 wherein said metallic reinforcing member comprises brass plated steel.

5. A method of improving the adhesion of a sulfur vulcanizable rubber to a metallic reinforcing member comprising vulcanizing said rubber in the presence of sulfur and ground coal having an average mesh size of 25 or more and which produces and aqueous slurry having a pH of less than 7.0.

* * * * *